No. 818,871. PATENTED APR. 24, 1906.
T. T. CARTER & S. J. THOMPSON.
MINER'S LAMP.
APPLICATION FILED OCT. 16, 1905.
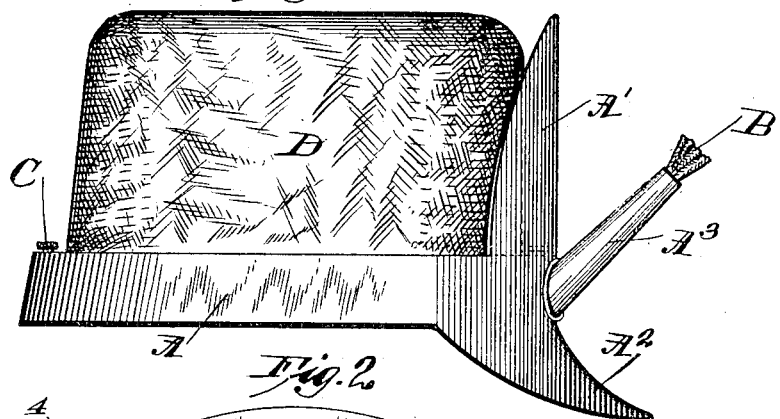
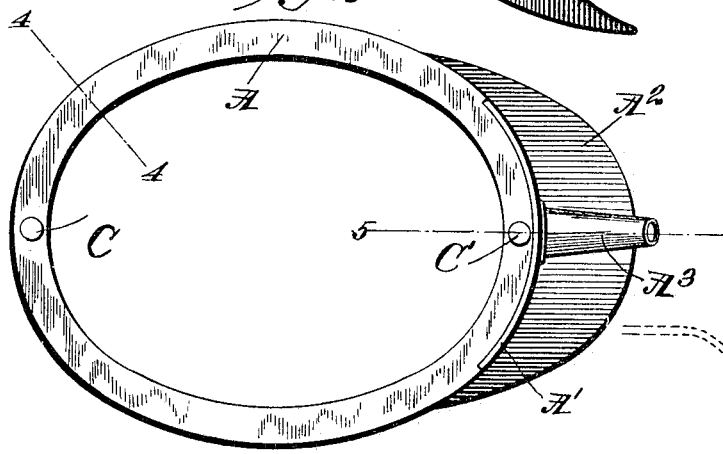
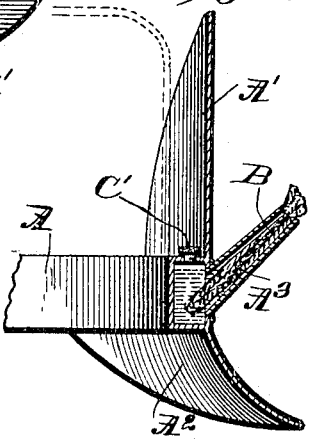
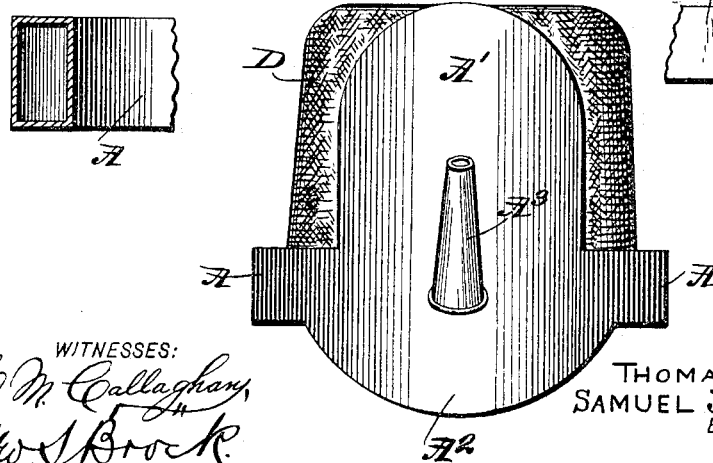
WITNESSES:
E. M. Callaghan
Geo. J. Brock
INVENTORS
THOMAS T. CARTER
SAMUEL J. THOMPSON
BY Munn & Co.
ATTORNEYS

UNITED STATES PATENT OFFICE.

THOMAS T. CARTER AND SAMUEL J. THOMPSON, OF BLUEFIELD, WEST VIRGINIA.

MINER'S LAMP.

No. 818,871.     Specification of Letters Patent.     Patented April 24, 1906.

Application filed October 16, 1905. Serial No. 282,973.

*To all whom it may concern:*

Be it known that we, THOMAS T. CARTER and SAMUEL J. THOMPSON, citizens of the United States, residing at Bluefield, in the county of Mercer and State of West Virginia, have invented a new and useful Improvement in Miners' Lamps, of which the following is a specification.

Our invention relates to improvements in miners' lamps, and is designed to provide a lamp which can be readily fitted over the cap of the miner or attached thereto and which shall be simple, cheap, and efficient.

Our invention consists in certain novel features of construction, arrangement, and combination of parts, as will be hereinafter fully described, and pointed out in the claims, reference being had to the accompanying drawings, in which—

Figure 1 is a side elevation showing our improvement applied to a cap. Fig. 2 is a top plan view of the device. Fig. 3 is a front elevation showing a device applied to a cap. Fig. 4 is a section on line 4 4 of Fig. 2. Fig. 5 is a detail section on line 5 5 of Fig. 1.

In carrying out our invention we use an annular tank or reservoir A of preferably the shape in cross-section shown in Fig. 4. At the front of the tank is disposed the upwardly-projecting rounded shield A' and the downwardly and outwardly projecting vizor $A^2$. The shield and vizor may be made in one piece with the outer wall of the tank or with each other or all separate, as desired. Projecting upwardly and outwardly from the front of the tank is the wick-spout $A^3$, said spout communicating with the interior of the tank and provided with the wick B.

C and C' represent screw-plugs closing openings in the upper wall of the tank, through which the tank may be filled and emptied. The opening covered by cap C' is just below the front shield A' and in alinement with the wick-spout $A^3$.

Our improvement is intended to be slipped over the cap of the miner, and the vizor $A^2$, which is of metal, will reinforce the usual cap-vizor, or it may take the place of the ordinary vizor.

If desired, the tank, with its shield and vizor may be permanently attached to the cap D and form a part thereof, so that when the miner dons his cap the lamp will be with him.

It will be seen that we provide a simple and efficient lamp that can be conveniently applied to the head of a miner.

It will be seen that the vizor and the shield-plate form projecting guards for the head of the wearer.

Having thus described our invention, what we claim as new, and desire to secure by Letters Patent, is—

1. A miner's lamp consisting of an annular tank or reservoir, a wick-spout communicating therewith and projecting forwardly and upwardly from the front of said tank, a curved vizor-plate projecting forwardly and obliquely downwardly from the front of said tank and a shield-plate projecting vertically upward from the upper edge of said tank, said shield-plate being curved to form a convex front face located in the rear of the wick-spout.

2. A miner's lamp consisting of an annular tank or reservoir, a wick-tube communicating therewith and projecting upwardly and obliquely therefrom, an integral transversely-curved vizor-plate projecting forwardly and obliquely downwardly from the lower front edge of said tank, and an integral shield-plate projecting vertically upward from the front upper edge of said tank, said shield-plate being curved to form a convex front face located in rear of the wick-spout.

THOMAS T. CARTER.
            SAMUEL J. THOMPSON.

Witnesses:
   J. W. KAVANAUGH,
   A. H. BALDWIN,
   WM. F. DIETZ.